US012573786B2

(12) United States Patent
Kanbara

(10) Patent No.: US 12,573,786 B2
(45) Date of Patent: Mar. 10, 2026

(54) PANEL MOUNT CONNECTOR

(71) Applicant: SUMITOMO WIRING SYSTEMS, LTD., Mie (JP)

(72) Inventor: Shota Kanbara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 300 days.

(21) Appl. No.: 18/275,943

(22) PCT Filed: Feb. 9, 2022

(86) PCT No.: PCT/JP2022/005050
§ 371 (c)(1),
(2) Date: Aug. 4, 2023

(87) PCT Pub. No.: WO2022/181325
PCT Pub. Date: Sep. 1, 2022

(65) Prior Publication Data

US 2024/0120680 A1 Apr. 11, 2024

(30) Foreign Application Priority Data

Feb. 25, 2021 (JP) ................................. 2021-028470

(51) Int. Cl.
*H01R 13/52* (2006.01)
*H01R 13/629* (2006.01)
*H01R 13/74* (2006.01)

(52) U.S. Cl.
CPC ... *H01R 13/5202* (2013.01); *H01R 13/62933* (2013.01); *H01R 13/74* (2013.01); *H01R 2201/26* (2013.01)

(58) Field of Classification Search
CPC .......... H01R 13/5202; H01R 13/62933; H01R 13/74; H01R 2201/26
See application file for complete search history.

(56) References Cited

U.S. PATENT DOCUMENTS

2003/0109166 A1 6/2003 Ookura
2009/0203251 A1 8/2009 Takahashi et al.

FOREIGN PATENT DOCUMENTS

JP 2002-002414 A 1/2002
JP 2002-151197 A 5/2002
(Continued)

OTHER PUBLICATIONS

English Translation of JP 2002-002414. (Year: 2002).*
(Continued)

*Primary Examiner* — Sean Gugger
(74) *Attorney, Agent, or Firm* — Venjuris, P.C.

(57) ABSTRACT

A panel mount connector is to be mounted on a panel including a connector mounting hole, and provided with a panel side housing including an inner receptacle projecting outwardly of the panel from the connector mounting hole and to be mounted on the panel, an inner housing to be fit into the inner receptacle, an outer housing including an outer receptacle disposed outside the panel and to be externally fit to the inner receptacle, the inner housing being mounted in the outer housing, a panel seal to be sandwiched between an outer peripheral edge part of the connector mounting hole in the panel and a tip part of the outer receptacle with both the inner housing and the outer receptacle fit to the inner receptacle, and a lever mounted movably between a connection start position and a connection completion position with respect to the outer receptacle.

5 Claims, 12 Drawing Sheets

(56) References Cited

FOREIGN PATENT DOCUMENTS

| | | | |
|---|---|---|---|
| JP | 2006-278109 | A | 10/2006 |
| JP | 2011-222224 | A | 11/2011 |
| JP | 2015-069835 | A | 4/2015 |

OTHER PUBLICATIONS

English Translation of JP 2011-222224. (Year: 2011).*

International Search Report issued on Apr. 26, 2022 for WO 2022/181325 A1 (6 pages).

* cited by examiner

PANEL MOUNT CONNECTOR

CROSS REFERENCE TO RELATED APPLICATIONS

This application is a national phase of PCT application No. PCT/JP2022/005050, filed on 9 Feb. 2022, which claims priority from Japanese patent application No. 2021-028470, filed on 25 Feb. 2021, all of which are incorporated herein by reference.

TECHNICAL FIELD

The present disclosure relates to a panel mount connector.

BACKGROUND

A connector, for example, described in Japanese Patent Laid-open Publication No. 2003-173837 (Patent Document 1) is known as a panel mount connector to be mounted on a panel such as a body or panel of an automotive vehicle. This connector is provided with a stand-by side connector housing to be mounted on the panel and a waterproof side connector housing to be connected to the stand-by side connector housing. The stand-by side connector housing includes a receptacle open forward. A flange portion is provided on a tip part of the outer periphery of the receptacle, and an annular mounting hole sealing member made of rubber is fit to the front surface of the flange portion. If the tip of the receptacle is inserted into a mounting hole provided in the panel, the mounting hole sealing member is held in close contact with the entire peripheral edge of the mounting hole and the panel and the stand-by side connector housing are mounted in a sealed state.

PRIOR ART DOCUMENT

Patent Document

Patent Document 1: JP 2003-173837 A

SUMMARY OF THE INVENTION

Problems to be Solved

Since the mounting hole of the panel is generally formed by being punched through press-working, the inner peripheral edge of the mounting hole is a fracture surface and is in a state easily corroded due to water. Since the mounting hole sealing member is in contact with an outer peripheral edge part of the mounting hole from the inside of the panel in the above connector, the fracture surface may be corroded if water intrudes into the mounting hole from the outside of the panel.

Means to Solve the Problem

The present disclosure is directed to a panel mount connector to be mounted on a panel including a connector mounting hole, the panel mount connector being provided with a panel side housing including an inner receptacle projecting outwardly of the panel from the connector mounting hole, the panel side housing being mounted on the panel, an inner housing to be fit into the inner receptacle, an outer housing including an outer receptacle disposed outside the panel and to be externally fit to the inner receptacle, the inner housing being mounted in the outer housing, a panel seal to be sandwiched between an outer peripheral edge part of the connector mounting hole in the panel and a tip part of the outer receptacle with both the inner housing and the outer receptacle fit to the inner receptacle, and a lever mounted movably between a connection start position and a connection completion position with respect to the outer receptacle, the lever fitting both the inner housing and the outer receptacle to the inner receptacle by moving from the connection start position to the connection completion position.

Effect of the Invention

According to the present disclosure, it is possible to avoid water intrusion into a connector mounting hole from the outside of a panel.

DETAILED DESCRIPTION TO EXECUTE THE INVENTION

Description of Embodiments of Present Disclosure

Figure 1:
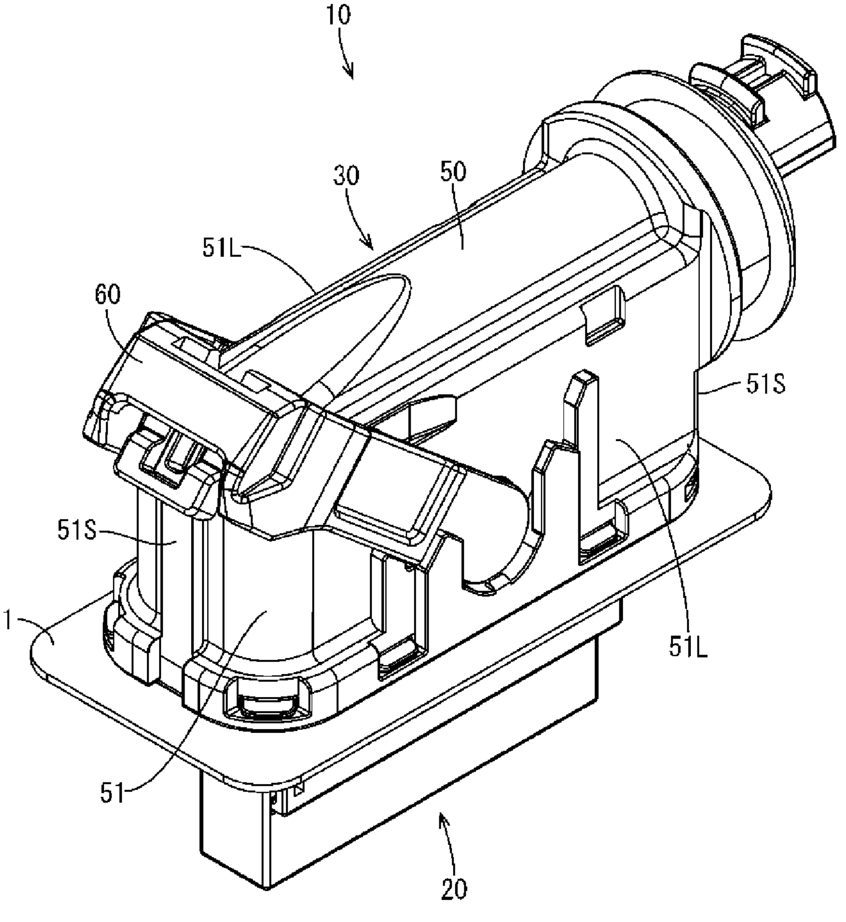
FIG. 1 is a perspective view of a panel mount connector with a lever located at a connection completion position when viewed obliquely from front.

First, embodiments of the present disclosure are listed and described.

(1) The panel mount connector of the present disclosure is to be mounted on a panel including a connector mounting hole, and provided with a panel side housing including an inner receptacle projecting outwardly of the panel from the connector mounting hole, the panel side housing being mounted on the panel, an inner housing to be fit into the inner receptacle, an outer housing including an outer receptacle disposed outside the panel and to be externally fit to the inner receptacle, the inner housing being mounted in the outer housing, a panel seal to be sandwiched between an outer peripheral edge part of the connector mounting hole in the panel and a tip part of the outer receptacle with both the inner housing and the outer receptacle fit to the inner receptacle, and a lever mounted movably between a connection start position and a connection completion position with respect to the outer receptacle, the lever fitting both the inner housing and the outer receptacle to the inner receptacle by moving from the connection start position to the connection completion position.

If the lever moves from the connection start position to the connection completion position, the inner housing is fit into the inner receptacle of the panel side housing and the outer receptacle of the outer housing is externally fit to the inner receptacle of the panel side housing, whereby a connection completed state is reached. In this connection completed state, the panel seal is sandwiched between the outer peripheral edge part of the connector mounting hole in the panel and the tip part of the outer receptacle. Here, since the outer receptacle is disposed outside the panel, the panel seal is also disposed outside the panel. Therefore, the panel seal can contact the outer peripheral edge part of the connector mounting hole outside the panel and avoid water intrusion into the connector mounting hole from the outside of the panel.

(2) Preferably, the panel mount connector is provided with a first receptacle seal to be sandwiched between an inner peripheral surface of the tip part of the outer receptacle and an outer peripheral surface of a base end part of the inner receptacle with both the inner housing and the outer receptacle fit to the inner receptacle and a second receptacle seal to be sandwiched between an inner peripheral surface of a base end part of the outer receptacle and an outer peripheral surface of a tip part of the inner receptacle with both the inner housing and the outer receptacle fit to the inner receptacle, the outer receptacle includes a lever mounting hole, the lever being mounted into the lever mounting hole, and the lever mounting hole is located between the first receptacle seal and the second receptacle seal in a fitting direction of the outer receptacle and the inner receptacle.

Since the outer receptacle includes the lever mounting hole, water may intrude into the outer receptacle from the lever mounting hole. However, since the lever mounting hole is located between the first and second receptacle seals in the fitting direction of the outer and inner receptacles, it can be avoided that water intrudes into the connector mounting hole from the inside of the outer receptacle or intrudes into the panel side housing.

(3) Preferably, the panel seal and the first receptacle seal are integrally connected.

With this configuration, the number of seal components can be reduced.

Details of Embodiment of Present Disclosure

A specific example of a panel mount connector 10 of the present disclosure is described below with reference to the drawings. Note that the present disclosure is not limited to these illustrations, but is represented by claims and intended to include all changes in the scope of claims and in the meaning and scope of equivalents.

[Configuration of Panel Mount Connector]

Figure 11:
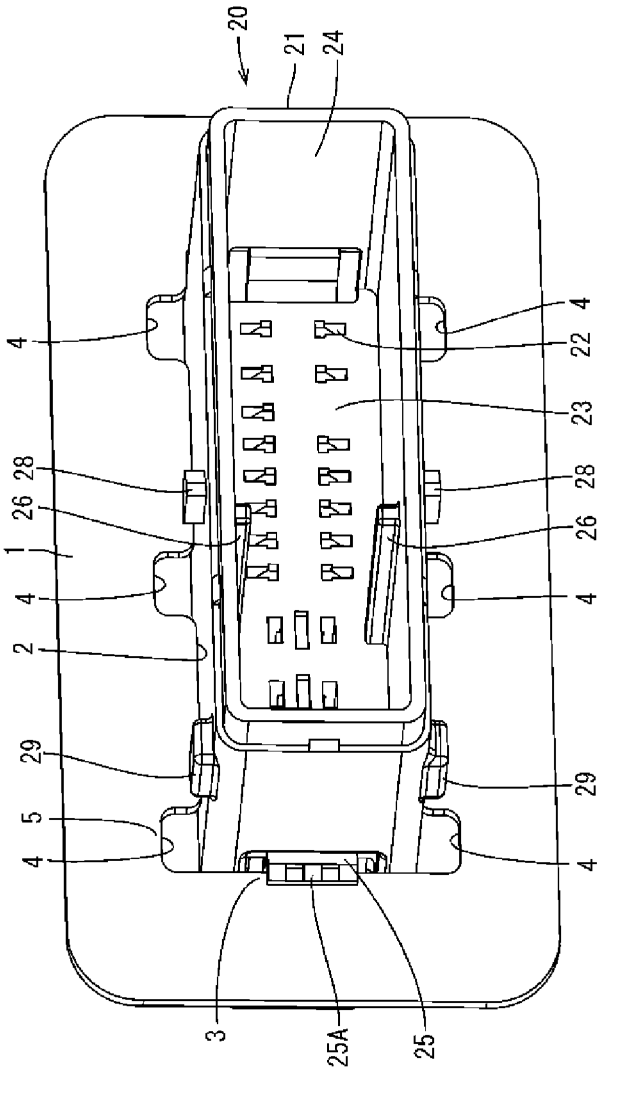
FIG. 11 is a perspective view of a male connector mounted on a panel when viewed obliquely from front.

The panel mount connector 10 of the present disclosure is a connector to be mounted on a panel 1, and provided with a male connector 20 and a female connector 30 connectable to the male connector 20. As shown in FIG. 11, the panel 1 is provided with a connector mounting hole 2. The male connector 20 serves as a stand-by side connector mounted in advance on the panel 1 while being inserted in the connector mounting hole 2. Note that a front-rear direction is based on a connecting direction of the male and female connectors 20, 30, and connection surface sides of the both connectors are referred to as front sides.

[Configuration of Male Connector]

Figure 9:
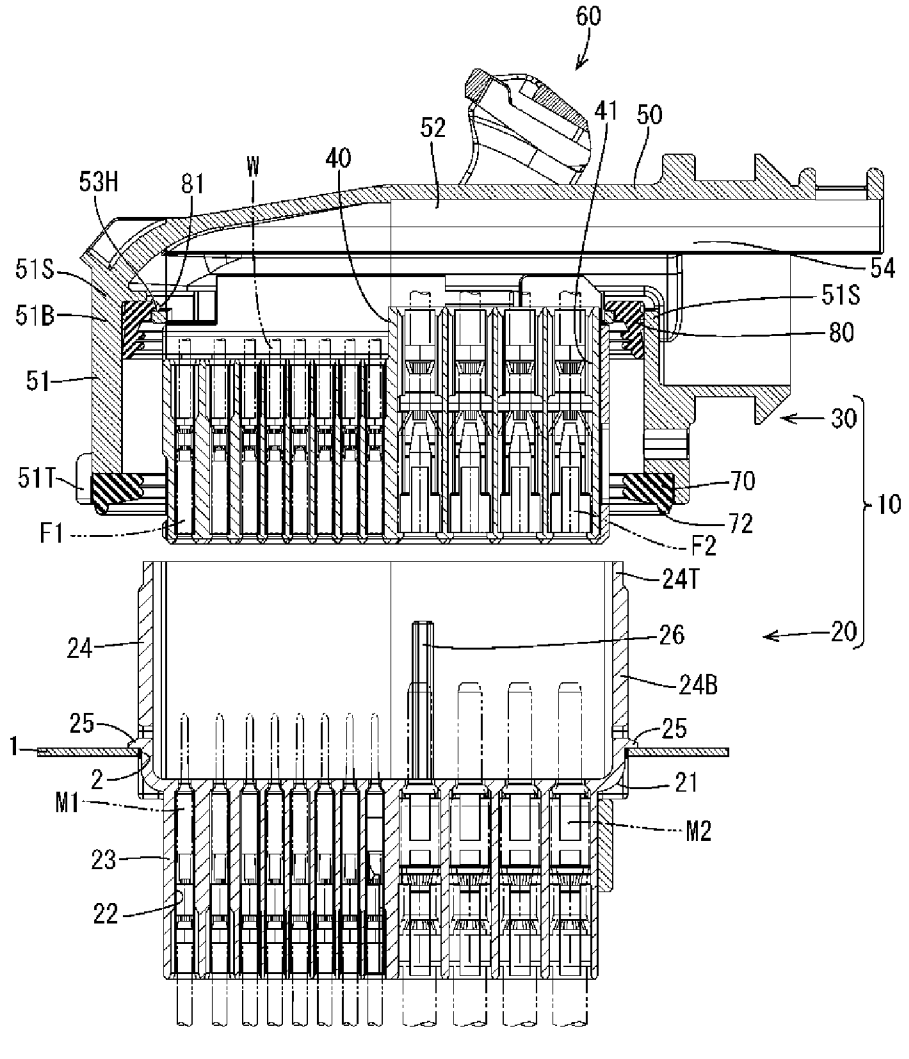
FIG. 9 is a section of the panel mount connector cut in the long side direction of the connector mounting hole with the lever located at the connection start position.

As shown in FIG. 9, the male connector 20 is provided with a male housing 21 and a plurality of male terminals M1, M2. The plurality of male terminals M1, M2 include small-size male terminals M1 and large-size male terminals M2 larger than the male terminals M1. The male housing 21 is made of synthetic resin and includes a male housing body 23 formed with a plurality of cavities 22 for accommodating the respective male terminals M1, M2 and an inner receptacle 24 projecting forward from the peripheral edge of the front surface of the male housing body 23. The inner receptacle 24 is in the form of a receptacle open forward.

Figure 5:
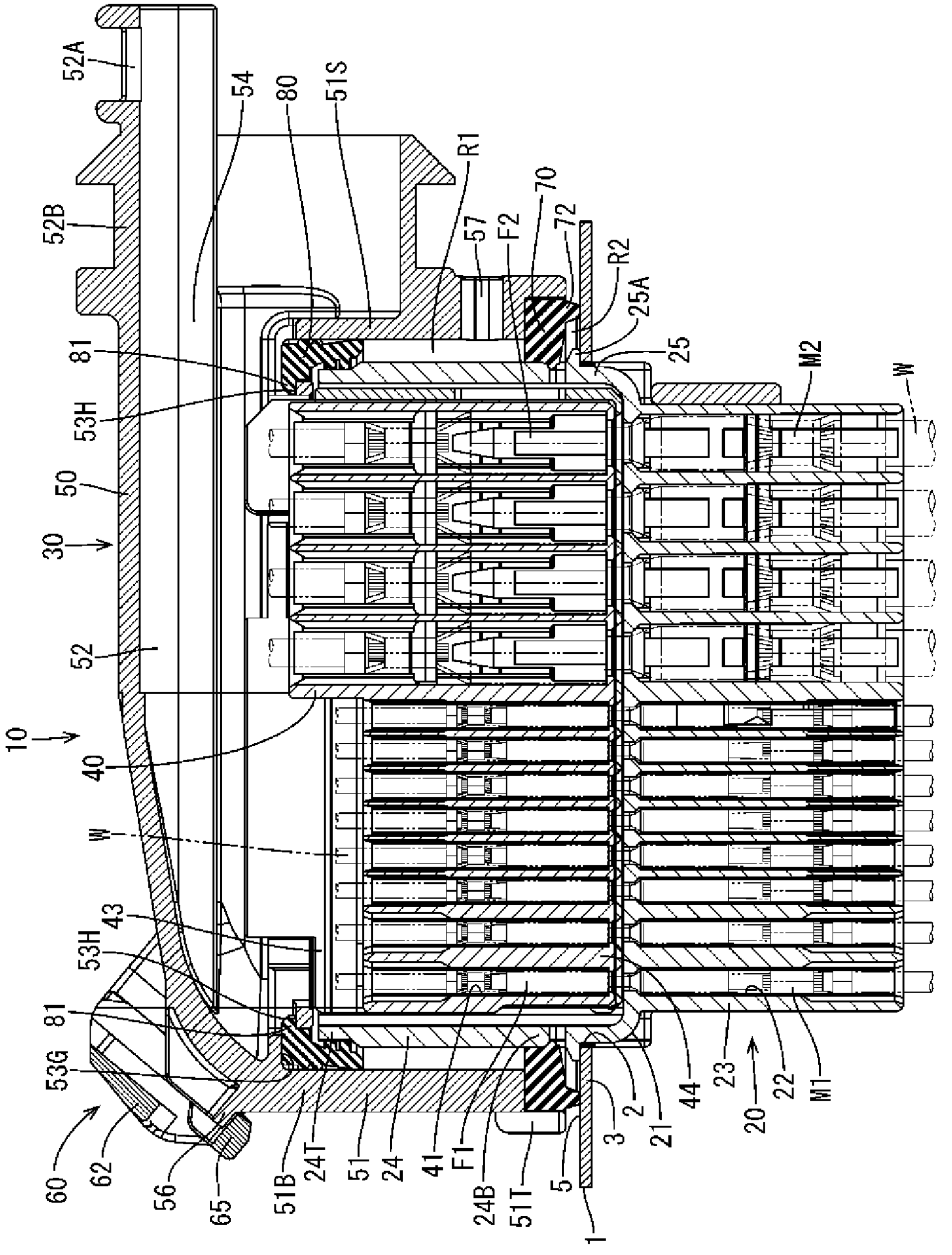
FIG. 5 is a section of the panel mount connector cut in a long side direction of a connector mounting hole with the lever located at the connection completion position.

A pair of panel locking pieces 25 are provided on both side surfaces of the male housing 21. As shown in FIG. 5, the panel locking piece 25 is cantilevered forward. A base end part of the panel locking piece 25 is located at the front end of the male housing body 23. On the other hand, a tip part of the panel locking piece 25 is located lateral to the inner receptacle 24. The tip part of the panel locking piece 25 is provided with a locking protrusion 25A. The panel locking piece 25 is so formed that the locking protrusion 25A is deflectable and deformable in directions toward and away from the inner receptacle 24.

The male connector 20 is inserted into the connector mounting hole 2 of the panel 1 from the inside (lower side in FIG. 5) of the panel 1. The inside of the panel 1 means the inside of an automotive vehicle and may be merely referred to as a vehicle inside below. The connector mounting hole 2 is formed by punching the panel 1 through press-working. Thus, the inner peripheral surface of the connector mounting hole 2 is a fracture surface.

If the male connector 20 reaches a proper mount position while deflecting the panel locking pieces 25, the panel locking pieces 25 resiliently return and the locking protrusions 25A lock an outer peripheral edge part 3 of the connector mounting hole 2 from the outside (upper side in FIG. 5) of the panel 1 as shown in FIG. 11. The outside of the panel 1 means the outside of the automotive vehicle and may be merely referred to as a vehicle outside below. In this way, the male connector 20 is suppressed from coming off to the vehicle inside.

Figure 12:
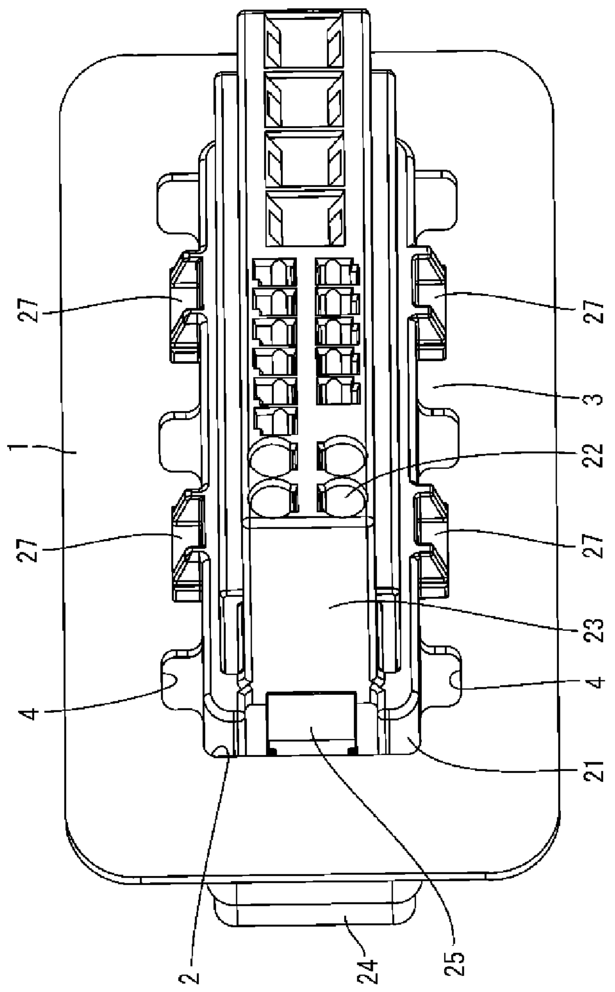
FIG. 12 is a perspective view of the male connector mounted on the panel when viewed obliquely from behind.

As shown in FIG. 12, a pair of panel receiving portions 27 are provided on each of the upper and lower surfaces of the inner receptacle 24. The panel receiving portion 27 can contact the outer peripheral edge part 3 of the connector mounting hole 2 of the panel 1 from the vehicle inside. In this way, the male connector 20 is suppressed from coming out to the vehicle outside. That is, by arranging the panel 1 between the locking protrusions 25A of the panel locking pieces 25 and the panel receiving portions 27 in the connecting direction of the male connector 20 and the female connector 30, the male connector 20 is held in a stand-by state to be mounted on the panel 1 in advance. In this state, the inner receptacle 24 is in a posture projecting to the outside of the panel 1.

As shown in FIG. 11, a pair of upper and lower ribs 26 are provided on the inner surface of the inner receptacle 24. The rib 26 is a reinforcing rib for preventing the deformation of the inner receptacle 24 at the time of heat aging. One fitting protrusion 28 and one erroneous coupling preventing protrusion 29 for the panel 1 are provided on each of the upper and lower surfaces of the inner receptacle 24. The fitting protrusions 28 are located in a lateral center of the inner receptacle 24. On the other hand, a pair of the erroneous coupling preventing protrusion 29 are located on one end part in the lateral direction of the inner receptacle 24 and arranged in the vertical direction.

The panel 1 is provided with a plurality of escaping holes 4, through which the respective fitting protrusions 28 and the respective erroneous coupling preventing protrusions 29 are passed. The plurality of escaping holes 4 are holes for enabling the insertion of the respective fitting protrusions 28 and the respective erroneous coupling preventing protrusions 29 without interference with the panel 1 when the male connector 20 is mounted on the panel 1 from the vehicle inside. If an attempt is made to mount the male connector 20 in a vertically inverted posture on the panel 1, the erroneous coupling preventing protrusions 29 interfere with the panel 1, thereby preventing the male connector 20 from being mounted. Note that, out of the outer peripheral edge part 3 of the connector mounting hole 2 outside the vehicle, a surface on outer peripheral sides of the respective escaping holes 4 serves as a sealing surface 5.

[Configuration of Female Connector]

As shown in FIG. 9, the female terminal 30 is provided with a female housing 40, a plurality of female terminals F1, F2, a holder 50, a lever 60, a bottom seal 70 and a top seal 80. The plurality of female terminals F1, F2 include small-size female terminals F1 and large-size female terminals F2 larger than the female terminals F1. The small-size male terminals M1 are fit into the small-size female terminals F1 to be conductively connected. The large-size male terminals M2 are fit into the large-size female terminals F2 to be conductively connected.

[Configuration of Female Housing]

The female housing 40 is made of synthetic resin and includes a plurality of cavities 41 for accommodating the respective female terminals F1, F2. The female housing 40 is fittable into the inner receptacle 24 of the male housing 21.

[Configuration of Holder]

The holder 50 is made of synthetic resin and includes an outer receptacle 51, into which the female housing 40 is accommodated, a wire accommodating portion 52 for accommodating wires W connected to the female terminals F1, F2 and housing fixing portions 53 for fixing the female housing 40. The outer receptacle 51 is externally fittable to the inner receptacle 24 of the male housing 21.

An internal space of the outer receptacle 51 and that of the wire accommodating portion 52 communicate. The wire accommodating portion 52 includes a wire draw-out opening 54 open laterally. The wires W pulled out rearward from the cavities 41 are drawn out to the outside of the holder 50 from the wire draw-out opening 54 after being bent at a right angle to extend toward the wire draw-out opening 54 inside the wire accommodating portion 52.

As shown in FIG. 1, the outer receptacle 51 includes a pair of long side portions 51L and a pair of short side portions 51S narrower than the long side portions 51L. As shown in FIG. 5, the wire draw-out opening 54 is provided behind the short side portion 51S. A wire fixing portion 52A for fixing the plurality of wires W by being fixed together with the plurality of wires W by a zip tie (not shown) is provided in an end part of the wire accommodating portion 52. A grommet mounting portion 52B, on which an unillustrated grommet is mounted, is provided in front of the wire fixing portion 52A. The entire panel mount connector 10 is waterproofed by the bottom seal 70, the top seal 80 and the grommet. A general-purpose grommet can be used as such a grommet, rather than a dedicated grommet.

Figure 10:
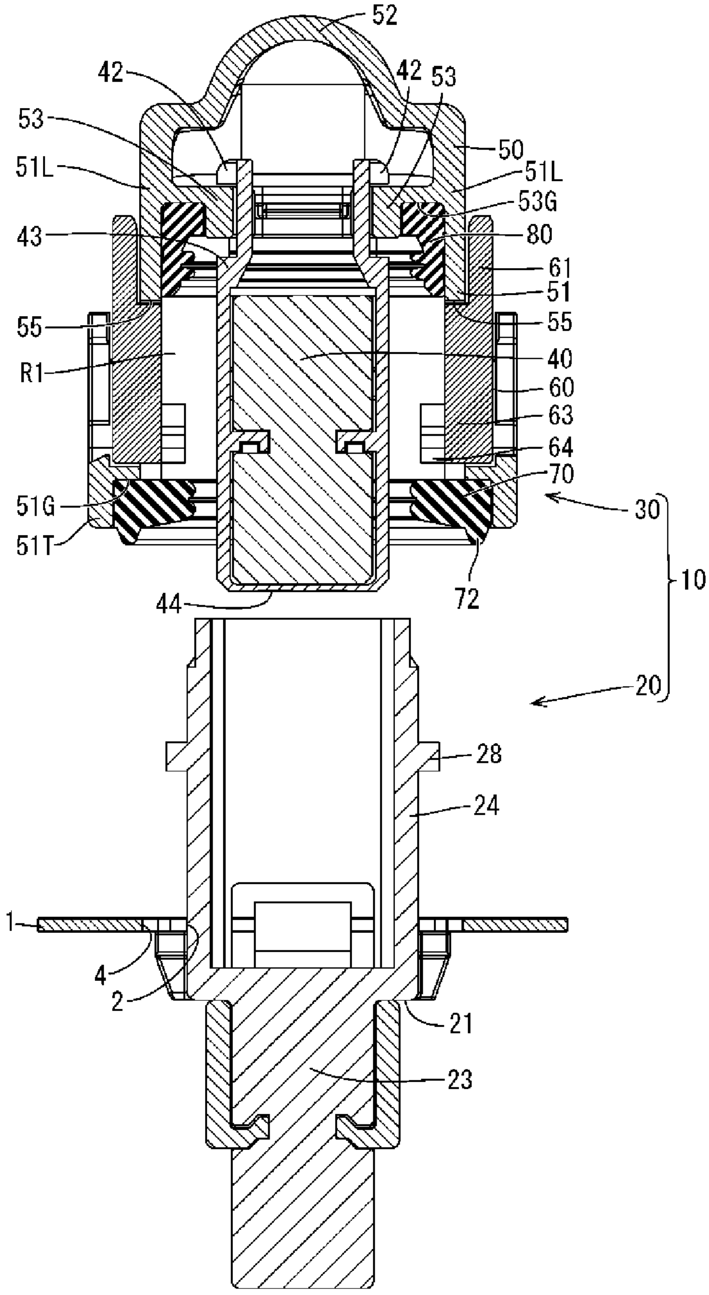
FIG. 10 is a section of the panel mount connector cut in the short side direction of the connector mounting hole with the lever located at the connection start position.

As shown in FIG. 10, the housing fixing portions 53 project inward from the long side portions 51L of the outer receptacle 51. A pair of the housing fixing portions 53 are arranged to face each other. On the other hand, a base end part 43 of the female housing 40 is provided with housing locking portions 42 for locking the housing fixing portions 53 from behind. A pair of the housing locking portions 42 are arranged to face each other. The female housing 40 is attached to the holder 50 by locking the pair of housing fixing portions 53 by the pair of housing locking portions 42. In this fixed state, a tip part 44 of the female housing 40 projects further forward than a tip part 51T of the outer receptacle 51.

Figure 3:
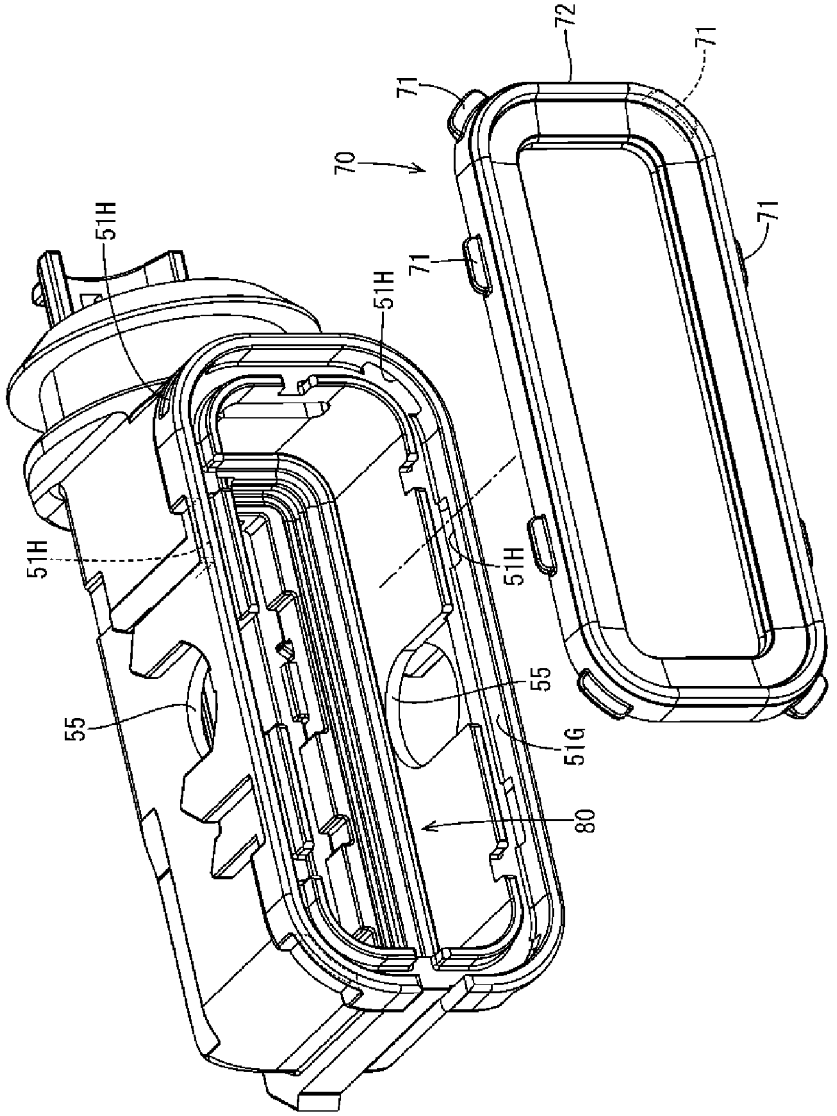
FIG. 3 is a perspective view showing a state where a bottom seal is removed from a holder.
Figure 6:
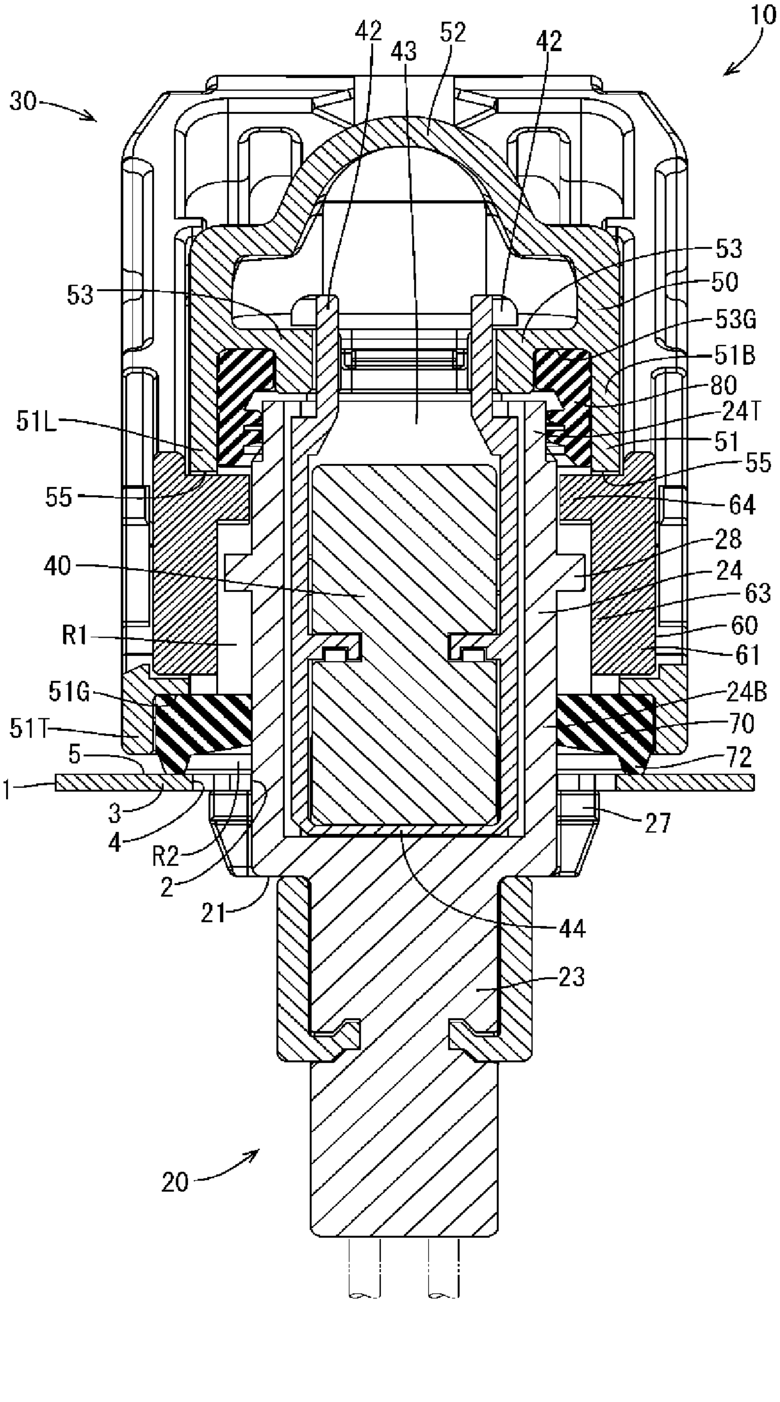
FIG. 6 is a section of the panel mount connector cut in a short side direction of the connector mounting hole with the lever located at the connection completion position.
Figure 7:
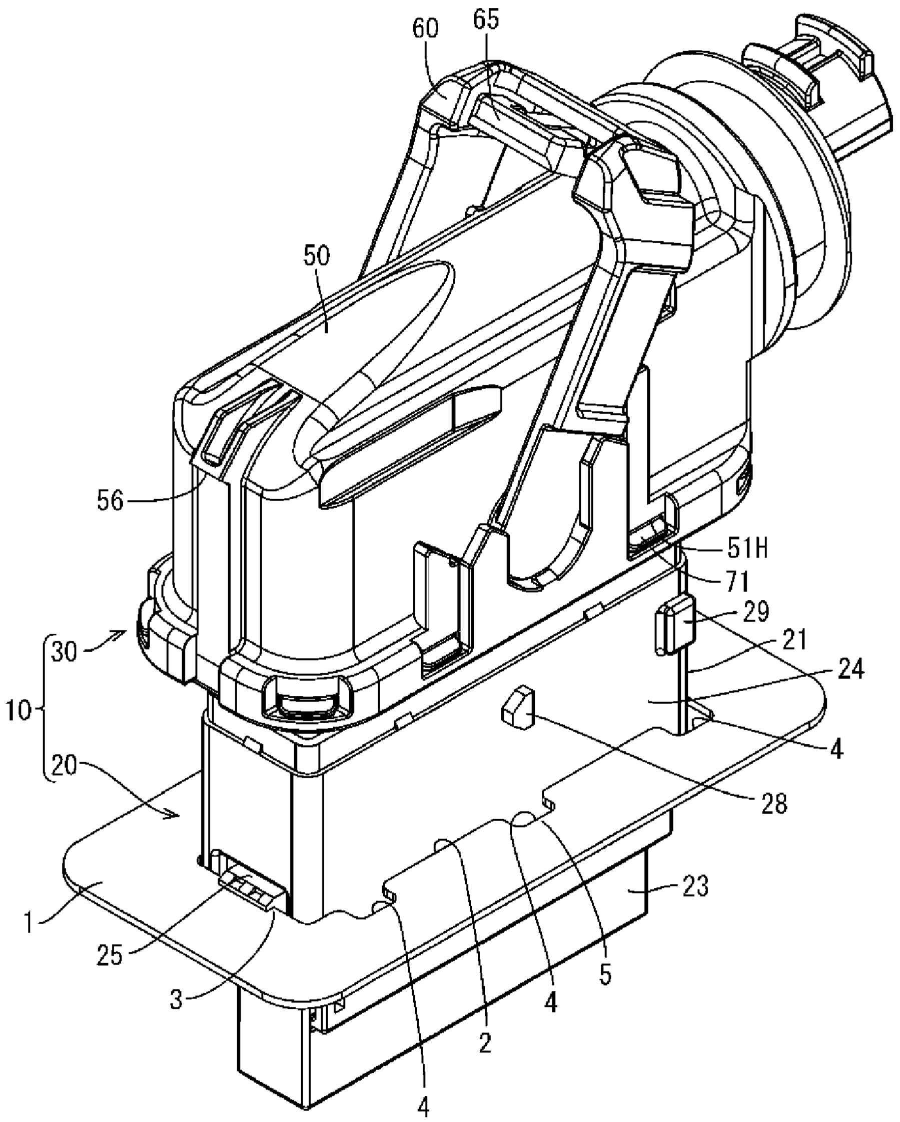
FIG. 7 is a perspective view of the panel mount connector with the lever located at a connection start position when viewed obliquely from front.

Lever mounting holes 55 for mounting the lever 60 are provided in front of the housing fixing portions 53 in the long side portions 51L of the outer receptacle 51 as shown in FIG. 3. As shown in FIG. 10, the lever mounting holes 55 penetrate through the long side portions 51L of the outer receptacle 51. Accordingly, a space communicating with the lever mounting holes 55, out of an internal space of the outer receptacle 51, serves as a non-waterproof region R1, into which water intrudes. As shown in FIG. 6, the lever mounting holes 55 are located between the bottom seal 70 and the top seal 80 in a fitting direction of the outer receptacle 51 and the inner receptacle 24. That is, out of an internal space surrounded by the inner peripheral surface of the outer receptacle 51 and the outer peripheral surface of the inner receptacle 24, a region between the bottom seal 70 and the top seal 80 is the non-waterproof region R1.

A top seal mounting groove 53G is provided in the front surface of the housing fixing portion 53. The top seal mounting groove 53G is recessed rearward. The top seal mounting groove 53G is provided to extend in a circumferential direction along the inner peripheral surface of the outer receptacle 51. The top seal 80 is mounted on the inner peripheral surface of the top seal mounting groove 53G. As shown in FIG. 9, a seal locking hole 53H communicating with the top seal mounting groove 53G is provided on the side of the short side portion 51S in the housing fixing portion 53.

[Configuration of Top Seal]

The top seal 80 is a resilient member made of rubber or the like and formed into an annular shape. As shown in FIG. 5, the top seal 80 is provided with top seal locking portions 81 for locking the housing fixing portions 53 from behind by entering the seal locking holes 53H. The top seal locking portions 81 lock the housing fixing portions 53, whereby the top seal 80 is held accommodated in the top seal mounting grooves 53G.

With the male and female connectors 20, 30 connected, the inner receptacle 24 is located between the female housing 40 and the outer receptacle 51 and the top seal 80 is sandwiched between a tip part 24T of the inner receptacle 24 and a base end part 51B of the outer receptacle 51 as shown in FIGS. 5 and 6. That is, with both the female housing 40 and the outer receptacle 51 fit to the inner receptacle 24, the top seal 80 is sandwiched between the inner peripheral surface of the base end part 51B of the outer receptacle 51 and the outer peripheral surface of the tip part 24T of the inner receptacle 24. In this way, water intrusion to a rear side of the female housing 40 from the non-waterproof region R1 communicating with the lever mounting holes 55 is suppressed.

[Configuration of Bottom Seal]

As shown in FIG. 3, a bottom seal mounting groove 51G is provided in the tip part 51T of the outer receptacle 51. The bottom seal mounting groove 51G is recessed rearward. The bottom seal mounting groove 51G is provided to extend in the circumferential direction along the inner peripheral surface of the outer receptacle 51. The bottom seal 70 is mounted on the inner peripheral surface of the bottom seal mounting groove 51G. A plurality of seal locking holes 51H communicating with the bottom seal mounting groove 51G are provided on the sides of the long side portions 51L in the tip part 51T of the outer receptacle 51.

The bottom seal 70 is a resilient member made of rubber or the like and formed into an annular shape. The bottom seal 70 is provided with a plurality of bottom seal locking portions 71 for locking the tip part 51T of the outer receptacle 51 from behind by entering the seal locking holes 51H. The bottom seal locking portions 71 lock the tip part 51T of the outer receptacle 51, whereby the bottom seal 70 is held accommodated in the bottom seal mounting groove 51G.

With both the female housing 40 and the outer receptacle 51 fit to the inner receptacle 24 as shown in FIGS. 5 and 6, the bottom seal 70 is sandwiched between the inner peripheral surface of the tip part 51T of the outer receptacle 51 and the outer peripheral surface of the base end part 24B of the inner receptacle 24. In this way, water intrusion to the side of the male housing body 23 through the connector mounting hole 2 of the panel 1 from the non-waterproof region R1 communicating with the lever mounting holes 55 is suppressed. In this way, the inside of the panel mount connector 10 is waterproofed by the bottom seal 70 and the top seal 80, which is realized outside the inner receptacle 24. As a result, the ribs 26 for preventing the deformation of the inner receptacle 24 at the time of heat aging at a high temperature can be provided inside the inner receptacle 24.

A lip 72 to be brought into contact with the sealing surface 5 of the panel 1 is integrally connected to the front surface of the bottom seal 70. The lip 72 is provided to continuously and annularly extend over the entire periphery of the bottom seal 70. With both the female housing 40 and the outer receptacle 51 fit to the inner receptacle 24, the bottom seal 70 is sandwiched between the tip part 51T of the outer receptacle 51 and the sealing surface 5 of the panel 1, whereby the lip 72 is held in close contact with the sealing surface 5. In this way, it is suppressed that water adhering to the panel 1 moves along the panel 1 from the vehicle outside and intrudes into the connector mounting hole 2. Therefore, a space covered by the front surface of the bottom seal 70 serves as a waterproof region R2 communicating with the connector mounting hole 2 as shown in FIG. 6. As shown in FIG. 5, the bottom seal 70 is arranged not to interfere with the locking protrusions 25A of the panel locking pieces 25.

[Configuration of Lever]

Figure 4:
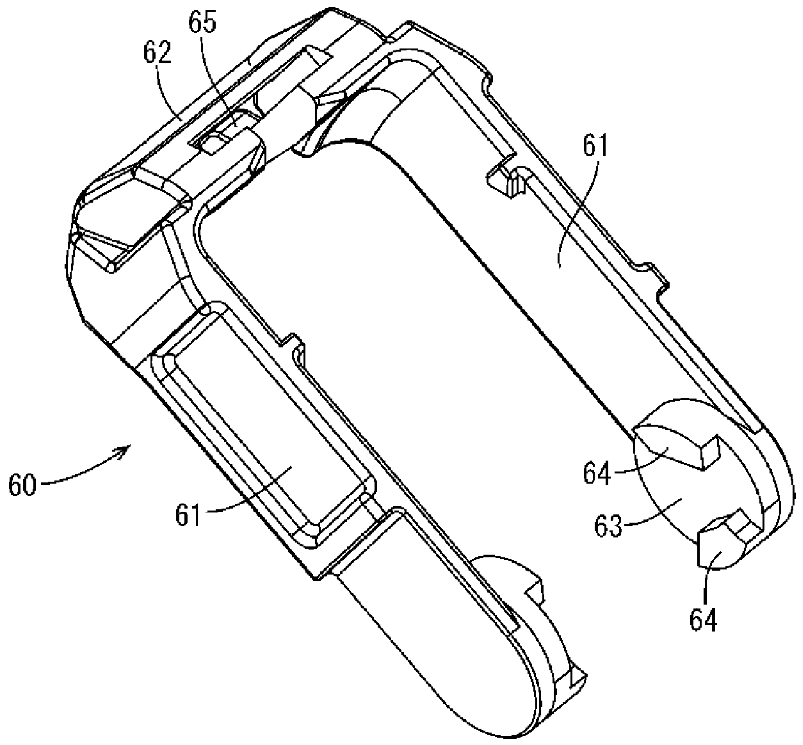
FIG. 4 is a perspective view of the lever.

The lever 60 is made of synthetic resin and, as shown in FIG. 4, gate-shaped as a whole. The lever 60 includes a pair of lever bodies 61 arranged to face each other and a lever operating portion 62 coupling end parts of the pair of lever bodies 61. A lever shaft portion 63 is provided on an end part of the lever body 61 on a side opposite to the lever operating portion 62. The lever shaft portion 63 is in the form of a circular projecting shaft. A pair of lever locking portions 64 are provided on the projecting end of the lever shaft portion 63.

As shown in FIG. 6, the lever shaft portions 63 rotatably support the lever 60 by being fit into the lever mounting holes 55 of the outer receptacle 51 from outside. Specifically, the lever 60 is rotatable between a connection start position shown in FIG. 9 and a connection completion position shown in FIG. 5 by operating the lever operating portion 62. If the lever 60 rotates from the connection start position to the connection completion position, both the female housing 40 and the outer receptacle 51 are fit to the inner receptacle 24 by the engagement of one lever locking portion 64 and each fitting protrusion 28. If the lever 60 rotates from the connection completion position to the connection start position, both the female housing 40 and the outer receptacle 51 are separated from the inner receptacle 24 by the engagement of the other lever locking portion 64 and each fitting protrusions 28.

The lever operating portion 62 is provided with a lever lock portion 65. As shown in FIG. 5, a lever holding protrusion 56 to be locked to the lever lock portion 65 is provided on the outer surface of the outer receptacle 51. The lever 60 is held at the connection completion position by locking the lever lock portion 65 to the lever holding protrusion 56. Therefore, in separating the female connector 30 from the male connector 20, the lever 60 is allowed to rotate from the connection completion position to the connection start position by releasing the locking of the lever lock portion 65.

[Operation Description of Panel Mount Connector]

Figure 8:
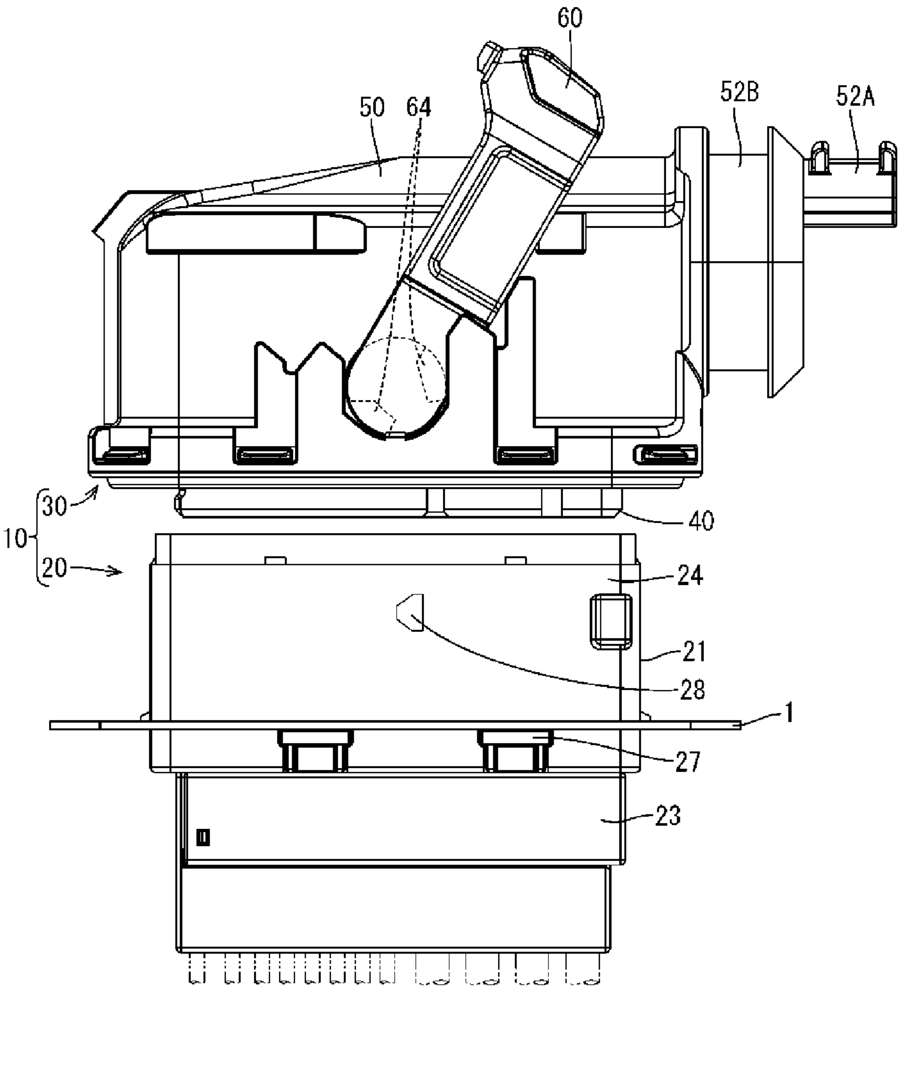
FIG. 8 is a side view of the panel mount connector with the lever located at the connection start position.

Next, the operation of the panel mount connector 10 is described. As shown in FIG. 8, if the lever 60 is rotated from the connection start position toward the connection completion position with the both connectors 20, 30 lightly fit such that each fitting protrusion 28 of the male connector 20 enters between the pair of lever locking portions 64 at the start of connection, the one lever locking portion 64 is engaged with each fitting protrusion 28, whereby the connection of the both connectors 20, 30 proceeds.

Figure 2:
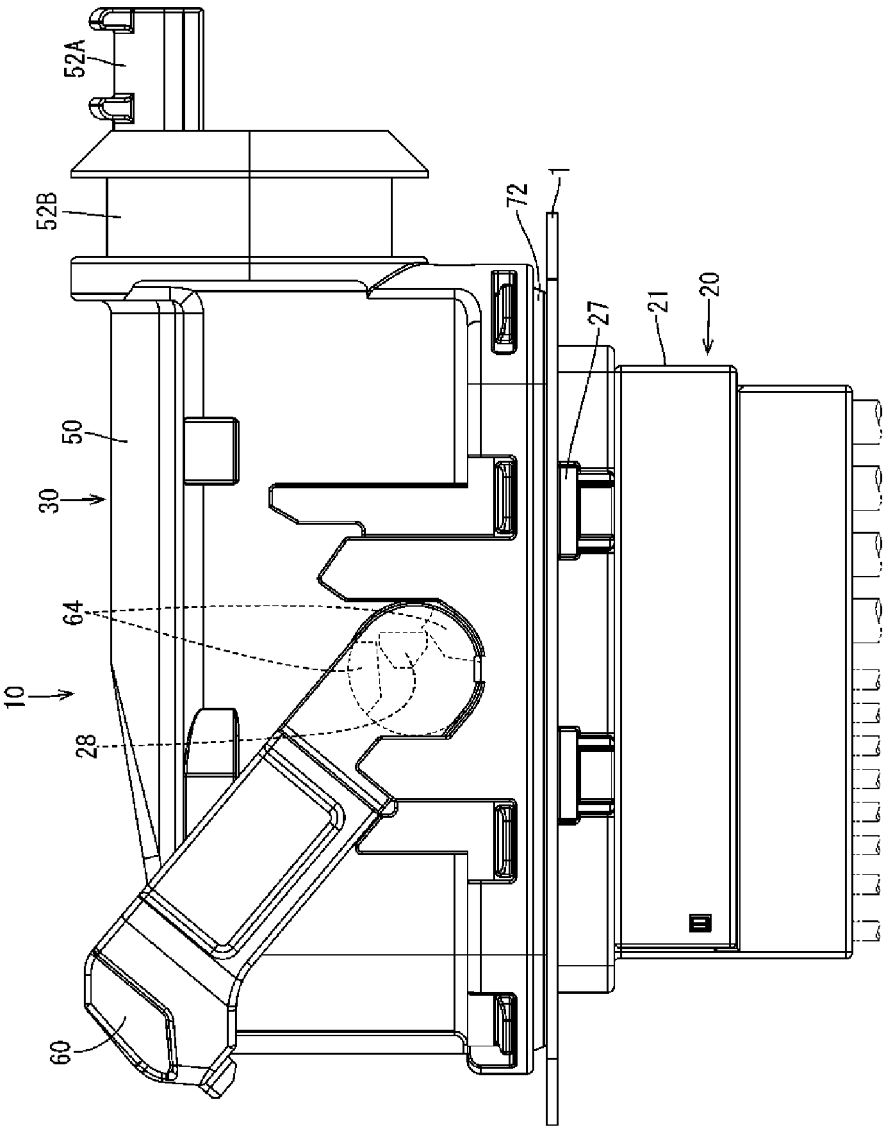
FIG. 2 is a side view of the panel mount connector with the lever located at the connection completion position.

If the lever 60 reaches the connection completion position as shown in FIG. 2, the both connectors 20, 30 reach a connection completed state, the male terminals M1, M2 are fit into the female terminals F1, F2 and the both connectors 20, 30 are electrically connected. In this state, the lip 72 of the bottom seal 70 mounted in the female connector 30 is held in close contact with the sealing surface 5 of the panel 1 over the entire periphery to form the waterproof region R2. Therefore, water intrusion into the connector mounting hole 2 from the vehicle outside is suppressed by the lip 72 and corrosion on the fracture surface of the connector mounting hole 2 due to water adhesion to the fracture surface or the like does not proceed.

Since the lever mounting holes 55 of the outer receptacle 51 are through holes as shown in FIG. 6, water may intrude into the non-waterproof region R1 of the outer receptacle 51. However, since the lever mounting holes 55 are provided between the bottom seal 70 and the top seal 80, it is suppressed that water intrudes into connected parts of the both housings 21, 40 from the non-waterproof region R1 and intrude into the connector mounting hole 2 from the non-waterproof region R1. If water intrudes into the non-waterproof region R1, this water is discharged to the vehicle outside from a water drainage hole 57 shown in FIG. 5.

[Functions and Effects of Panel Mount Connector]

The panel mount connector 10 is mounted on the panel 1 including the connector mounting hole 2 and is provided with the male housing 21 including the inner receptacle 24 projecting outwardly of the panel 1 from the connector mounting hole 2 and to be mounted on the panel 1, the female housing 40 to be fit into the inner receptacle 24, the outer receptacle 51 disposed outside the panel 1 and to be externally fit to the inner receptacle 24, the holder 50 having the female housing 40 attached thereto, the lip 72 to be sandwiched between the outer peripheral edge part 3 of the connector mounting hole 2 in the panel 1 and the tip part 51T of the outer receptacle 51 with both the female housing 40 and the outer receptacle 51 fit to the inner receptacle 24, and the lever 60 mounted movably between the connection start position and the connection completion position with respect to the outer receptacle 51 and fitting both the female housing 40 and the outer receptacle 51 to the inner receptacle 24 by moving from the connection start position to the connection completion position.

If the lever 60 moves from the connection start position to the connection completion position, the female housing 40 is fit into the inner receptacle 24 of the male housing 21 and the outer receptacle 51 of the holder 50 is externally fit to the inner receptacle 24 of the male housing 21, whereby the connection completed state is reached. In this connection completed state, the lip 72 is sandwiched between the outer peripheral edge part 3 of the connector mounting hole 2 in the panel 1 and the tip part 51T of the outer receptacle 51. Here, since the outer receptacle 51 is disposed outside the panel 1, the lip 72 is also disposed outside the panel 1. Therefore, the lip 72 can contact the outer peripheral edge part 3 of the connector mounting hole 2 outside the panel 1 and avoid water intrusion into the connector mounting hole 2 from the outside of the panel 1.

(2) Preferably, the panel mount connector is provided with the bottom seal 70 to be sandwiched between the inner peripheral surface of the tip part 51T of the outer receptacle 51 and the outer peripheral surface of the base end part 24B of the inner receptacle 24 with both the female housing 40 and the outer receptacle 51 fit to the inner receptacle 24 and the top seal 80 to be sandwiched between the inner peripheral surface of the base end part 51B of the outer receptacle 51 and the outer peripheral surface of the tip part 24T of the inner receptacle 24 with both the female housing 40 and the outer receptacle 51 fit to the inner receptacle 24, the outer receptacle 51 includes the lever mounting holes 55, into which the lever 60 is mounted, and the lever mounting holes 55 are located between the bottom seal 70 and the top seal 80 in the fitting direction of the outer receptacle 51 and the inner receptacle 24.

Since the outer receptacle 51 includes the lever mounting holes 55, water may intrude into the inside of the outer receptacle 51 through the lever mounting holes 55. However, since the lever mounting holes 55 are located between the bottom seal 70 and the top seal 80 in the fitting direction of the outer receptacle 51 and the inner receptacle 24, it can be avoided that water intrudes into the connector mounting hole 2 from the inside of the outer receptacle 51 or intrudes into the male housing 21.

(3) Preferably, the lip 72 and the bottom seal 70 are integrally connected.

With this configuration, the number of seal components can be reduced.

OTHER EMBODIMENTS (1) Although the rotatable lever 60 is illustrated in the above embodiment, a slidable lever may be adopted.

(2) Although the female connector 30 including the bottom seal 70 and the top seal 80 is illustrated in the above embodiment, a female connector may be provided with only a seal including a lip capable of contacting the panel 1 if a holder is not provided with lever mounting holes and the inside of the female connector is a waterproof region.

(3) Although the outer receptacle 51 is provided with the lever mounting holes 55 in the above embodiment, the outer receptacle 51 may be provided with shaft portions instead of the lever mounting holes 55 and the lever may be provided with holes to be fit to the shaft portions.

(4) Although the male connector 20 is mounted on the panel 1 from inside in the above embodiment, a male connector may be mounted on a panel from outside.

LIST OF REFERENCE NUMERALS

1: pane, 2: connector mounting hole, 3: outer peripheral edge part, 4: escaping hole, 5: sealing surface

10: panel mount connector

20: male connector, 21: male housing (panel side housing), 22: cavity, 23: male housing body, 24: inner receptacle, 24B: base end part, 24T: tip part, 25: panel locking piece, 25A: locking protrusion, 26: rib, 27: panel receiving portion, 28: fitting protrusion, 29: erroneous coupling preventing protrusion

30: female connector

40: female housing (inner housing), 41: cavity, 42: housing locking portion, 43: base end part, 44: tip part

50: holder (outer housing), 51: outer receptacle, 51B: base end part, 51G: bottom seal mounting groove, 51H: seal locking hole, 51L: long side portion, 51S: short side portion, 51T: tip part, 52: wire accommodating portion, 52A: wire fixing portion, 52B: grommet mounting portion, 53: housing fixing portion, 53G: top seal mounting groove, 53H: seal locking hole, 54: wire draw-out opening, 55: lever mounting hole, 56: lever holding protrusion, 57: water drainage hole

60: lever, 61: lever body, 62: lever operating portion, 63: lever shaft portion, 64: lever locking portion, 65: lever lock portion

70: bottom seal (first receptacle seal), 71: bottom seal locking portion, 72: lip (panel seal)

80: top seal (second receptacle seal), 81: top seal locking portion

F1: small-size female terminal, F2: large-size female terminal

M1: small-size male terminal, M2: large-size male terminal

R1: non-waterproof region, R2: waterproof region

W: wire

What is claimed is:

1. A panel mount connector to be mounted on a panel including a connector mounting hole, comprising:

a panel side housing including an inner receptacle projecting outwardly of the panel from the connector mounting hole, the panel side housing being mounted on the panel;

an inner housing to be fit into the inner receptacle;

an outer housing including an outer receptacle disposed outside the panel and to be externally fit to the inner receptacle, the inner housing being mounted in the outer housing;

a panel seal to be sandwiched between an outer peripheral edge part of the connector mounting hole in the panel and a tip part of the outer receptacle with both the inner housing and the outer receptacle fit to the inner receptacle;

a first receptacle seal and a second receptacle seal, each to be sandwiched between the outer receptacle and the inner receptacle, with both the inner housing and the outer receptacle fit to the inner receptacle, the first receptacle seal and the second receptacle seal being spaced apart from each other in a fitting direction of the outer receptacle and the inner receptacle while overlapping each other when viewed along the fitting direction; and a lever mounted movably between a connection start position and a connection completion position with respect to the outer receptacle, the lever fitting both the inner housing and the outer receptacle to the inner receptacle by moving from the connection start position to the connection completion position, wherein the outer receptacle includes a through hole located between the first receptacle seal and the second receptacle seal in the fitting direction.

2. The panel mount connector according to claim 1, wherein:

the first receptacle seal is to be sandwiched between an inner peripheral surface of the tip part of the outer receptacle and an outer peripheral surface of a base end part of the inner receptacle with both the inner housing and the outer receptacle fit to the inner receptacle; and the second receptacle seal is to be sandwiched between an inner peripheral surface of a base end part of the outer receptacle and an outer peripheral surface of a tip part of the inner receptacle with both the inner housing and the outer receptacle fit to the inner receptacle, and the through hole includes a lever mounting hole, the lever being mounted into the lever mounting hole.

3. The panel mount connector according to claim 2, wherein the panel seal and the first receptacle seal are integrally connected.

4. A panel mount connector to be mounted on a panel including a connector mounting hole, comprising:

a panel side housing including an inner receptacle projecting outwardly of the panel from the connector mounting hole, the panel side housing being mounted on the panel;

an inner housing to be fit into the inner receptacle;

an outer housing including an outer receptacle disposed outside the panel and to be externally fit to the inner receptacle, the inner housing being mounted in the outer housing;

a panel seal to be sandwiched between an outer peripheral edge part of the connector mounting hole in the panel and a tip part of the outer receptacle with both the inner housing and the outer receptacle fit to the inner receptacle;

a first receptacle seal to be sandwiched between an inner peripheral surface of the tip part of the outer receptacle and an outer peripheral surface of a base end part of the inner receptacle with both the inner housing and the outer receptacle fit to the inner receptacle;

a second receptacle seal to be sandwiched between an inner peripheral surface of a base end part of the outer receptacle and an outer peripheral surface of a tip part of the inner receptacle with both the inner housing and the outer receptacle fit to the inner receptacle; and a lever mounted movably between a connection start position and a connection completion position with respect to the outer receptacle, the lever fitting both the inner housing and the outer receptacle to the inner receptacle by moving from the connection start position to the connection completion position, wherein:

the outer receptacle includes a lever mounting hole, the lever being mounted into the lever mounting hole, and the lever mounting hole is located between the first receptacle seal and the second receptacle seal in a fitting direction of the outer receptacle and the inner receptacle.

5. The panel mount connector according to claim 4, wherein the panel seal and the first receptacle seal are integrally connected.

* * * * *